United States Patent
Fan et al.

(10) Patent No.: US 9,002,188 B2
(45) Date of Patent: *Apr. 7, 2015

(54) MULTI-DRIVE MECHANISM LENS ACTUATOR

(75) Inventors: Kin Ming Fan, New Territories (HK); Sio Kuan Lam, New Territories (HK); Kwok Sing Cheng, Tuen Mun (HK); Wing Ming Fan, New Territories (HK); Hua Yang, Shenzhen (CN); Tiegang Liu, HuNan Province (CN)

(73) Assignee: Hong Kong Applied Science and Technology Research Institute Co. Ltd., Shatin, New Territories (HK)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,211

(22) Filed: Aug. 1, 2012

(65) Prior Publication Data

US 2013/0083231 A1   Apr. 4, 2013

Related U.S. Application Data

(62) Division of application No. 12/243,801, filed on Oct. 1, 2008, now Pat. No. 8,249,440.

(51) Int. Cl.
*G03B 17/00* (2006.01)
*G02B 7/02* (2006.01)
*G03B 5/02* (2006.01)
*H04N 5/232* (2006.01)

(52) U.S. Cl.
CPC ...... *G02B 7/026* (2013.01); *G03B 5/02* (2013.01); *H04N 5/23212* (2013.01); *H04N 5/23287* (2013.01)

(58) Field of Classification Search
USPC ........... 396/52, 55, 529, 532, 542; 348/208.4, 348/208.7, 208.11, 208.99; 359/554–557
See application file for complete search history.

(56) References Cited

U.S. PATENT DOCUMENTS

| | | | |
|---|---|---|---|
| 6,307,678 B2 * | 10/2001 | Kosaka et al. | 359/557 |
| 6,940,542 B2 * | 9/2005 | Kitazawa et al. | 348/208.99 |
| 7,295,388 B2 * | 11/2007 | Shyu et al. | 359/814 |
| 7,725,014 B2 * | 5/2010 | Lam et al. | 396/55 |
| 7,782,559 B2 * | 8/2010 | Huang et al. | 359/824 |
| 8,249,440 B2 * | 8/2012 | Fan et al. | 396/55 |
| 2006/0033818 A1 * | 2/2006 | Wada et al. | 348/208.11 |
| 2006/0034599 A1 * | 2/2006 | Osaka | 396/144 |
| 2006/0072912 A1 * | 4/2006 | Momochi et al. | 396/55 |
| 2006/0146400 A1 * | 7/2006 | Seo | 359/368 |
| 2007/0146883 A1 * | 6/2007 | Akada et al. | 359/554 |
| 2009/0002825 A1 * | 1/2009 | Morita et al. | 359/554 |
| 2009/0091829 A1 * | 4/2009 | Nagai et al. | 359/557 |

* cited by examiner

*Primary Examiner* — Clayton E Laballe
*Assistant Examiner* — Warren K Fenwick
(74) *Attorney, Agent, or Firm* — Berkeley Law & Technology, LLP

(57) ABSTRACT

Subject matter disclosed herein may relate to lens actuators used, for example, in auto-focus and/or vibration compensation systems of digital cameras.

12 Claims, 5 Drawing Sheets

MULTI-DRIVE MECHANISM LENS ACTUATOR

This application is a Divisional of U.S. patent application Ser. No. 12/243,801, filed on Oct. 1, 2008, entitled "MULTI-DRIVE MECHANISM LENS ACTUATOR," the contents of which are incorporated herein by reference.

FIELD

Subject matter disclosed herein may relate to lens actuators used, for example, in auto-focus and/or vibration compensation systems of digital cameras.

BACKGROUND

Lens actuators may find utility in a number of applications, including, for example, digital cameras and/or cameras incorporated into cellular phones and/or other portable electronic devices. Lens actuators may be used to adjust the position of one or more lenses in an effort to improve image quality. For example, a camera may implement an auto-focus function, where an image may be analyzed and adjustments made to the position of one or more lenses to correct the focal length. For another example, vibrations may be detected and adjustments made to the positioning of one or more lenses to compensate for camera movements resulting from the vibrations.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
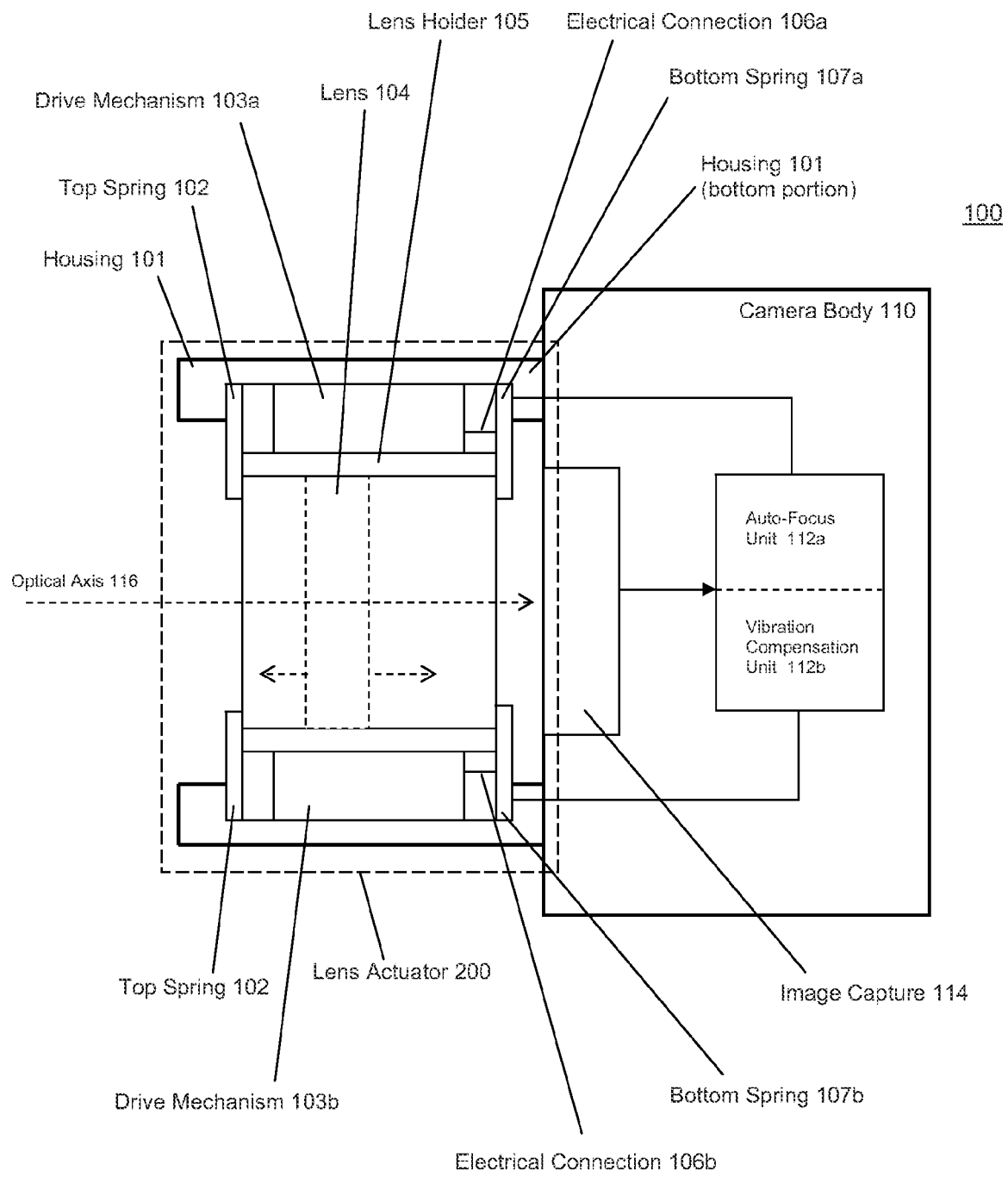
FIG. 1 is a diagram of an example embodiment of a digital camera.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

As discussed above, lens actuators may find utility in a number of applications, including, for example, digital cameras and/or cameras incorporated into cellular phones and/or other portable electronic devices. Lens actuators may be used, for example, to perform auto-focus functions and/or to compensate for vibrations. To perform auto-focus functions, for example, an image may be analyzed and adjustments may be made to the position of one or more lenses to correct the focal length. Such adjustments to the position of a lens may be made in a direction along an optical axis. To perform vibration compensation operations, vibrations may be detected and adjustments may be made to the positioning of one or more lenses to compensate for camera movements resulting from the vibrations. Such adjustments to the positioning of the lens for vibration compensation may be made by way of a tilting motion of the lens in relation to the optical axis.

Lens actuators may comprise one or more drive mechanisms that may cause a lens to move in a linear fashion in relation to an optical axis, that is, in relation to an optical path of an image to be captured. Difficulties may be encountered in energizing the drive mechanisms. For example, wires may be used to deliver electrical signals from a printed circuit board (PCB) to one or more drive mechanisms. Such wires may pass through holes in a housing for the lens actuator. However, such a configuration may result in reliability issues due to movement of the wires as the lens holder moves back and forth. Such movement of the wires may cause the wires to rub against one or more components, such as, for example, the lens holder housing, and such rubbing may, in turn, lead to premature failure of the wire and/or to a wearing of the wire's insulation, possibly resulting in a short circuit and circuit failure.

In addition to reliability concerns as they relate to auto-focus and vibration compensation functions, cost concerns may become issues as camera designs become more complex and as more components are added to the design and manufacture of the camera.

For one or more embodiments described herein, and in accordance with claimed subject matter, an apparatus such as, for example, a digital camera and/or a cellular phone and/or other personal digital device incorporating a camera may comprise a plurality of drive mechanisms to enable adjustments to a lens in more than one dimension. Electrical signals may be provided to the drive mechanisms via a spring that may be utilized to both provide a restoring force to a lens holder and to provide electrical connections to the drive mechanisms. The spring may comprise a plurality of electrically conductive elements to carry the electrical signals to the plurality of drive mechanisms. The plurality of drive mechanisms may be individually actuated depending on voltage levels transmitted to the individual drive mechanisms.

For example, if approximately equal voltage levels are transmitted to the drive mechanisms, the lens holder may be caused to move in an essentially linear fashion along the optical axis. However, if unequal voltages are provided to the various drive mechanisms, the lens holder may be caused to "tilt" in relation to the optical axis. For example, if a particular example camera incorporates a lens actuator comprising two drive mechanisms, one drive mechanism may be disposed on one side of a lens holder and another drive mechanism may be disposed on an opposite side of the lens holder. If a voltage is applied to only one of the two drive mechanisms, only one drive mechanism will cause movement for a respective side of the lens holder, and the opposite side may remain essentially stationary. Thus, in this fashion, the lens holder, and therefore the lens, may be caused to tilt about an axis perpendicular to the optical axis.

For one or more embodiments described herein, a spring may be used to deliver electrical signals to a plurality of drive mechanisms. Springs may be found in a wide range of lens actuator implementations, where such springs provide a restoring force to a lens holder to tend to return the lens holder to a neutral position in the event that none of the drive mechanisms are energized. By utilizing a spring to transmit multiple electrical signals to multiple drive mechanisms and to also provide a restoring force to the lens holder, multiple functions may therefore be performed by the spring, thus resulting in a reduced bill of materials if compared to an implementation utilizing separate components for providing the restoring force and for communicating electrical signals to the drive mechanisms. Also, because there is no need to run wires from the drive mechanisms through a lens holder housing to a PCB, wire rubbing may be reduced or eliminated, thereby improving system reliability.

FIG. 1 is a diagram of an example embodiment of a digital camera 100. Camera 100 may comprise a body 110 and a lens actuator 200 coupled to body 110. Lens actuator 200 may comprise a housing 101, including a top portion and a bottom portion, where the direction "top" refers to the end of the housing farthest from body 110, and where the direction "bottom" refers to the end of the housing closest to body 110.

A lens holder 105 may be disposed within housing 101, and a lens 104 may be disposed within lens holder 105. Lens holder 105 may be caused to move by a drive mechanism 103a and by a drive mechanism 103b, disposed between lens holder 105 and housing 101. If a voltage is applied to drive mechanism 103a, for example, the portion of lens holder 105 adjacent to drive mechanism 103a may tend to displace along an optical axis 116. If approximately equal voltages are applied to drive mechanisms 103a and 103b, lens holder 105 may move in a linear fashion along optical axis 116. The amount of movement may be based, at least in part, on the voltage levels applied to the drive mechanisms. Small voltage levels may tend to cause small movements of the lens holder, and larger voltage levels may tend to cause larger movements of the lens holder. An unequal distribution of voltage levels between the drive mechanisms may result in lens holder 105 "tilting" in relation to optical axis 116 due to the uneven movement of either side of lens holder 105.

For one or more embodiments, a bottom spring 107 may comprise a plurality of separate portions, each capable of conducting separate electrical signals to one or more drive mechanisms. For the example depicted in FIG. 1, two drive mechanisms are described, and so spring 107 may comprise at least two electrically conductive elements, labeled springs 107a and 107b. Of course, even though the present example describes two electrically conductive elements for spring 107, the scope of claimed subject matter is not limited in this respect, and other embodiments are possible utilizing a larger number of electrically conductive elements for bottom spring 107.

Also, for one or more embodiments, a top spring 102 may be disposed between housing 101 and lens holder 105. A movement of lens holder 105 along optical axis 116 away from camera body 110 may result in a restoring force being applied by top spring 102 to lens holder 105. Similarly, a movement of lens holder 105 along the optical axis towards camera body 110 may result in a restoring force being applied to lens holder 105 by bottom spring 107. As described above, spring 107 may comprise a plurality of separate elements, and individual elements may be capable of applying separate forces to different portions of lens holder 105. For one or more embodiments, top spring 102 may be implemented such that separate forces may be applied to different portion of lens holder 105 so that springs 107 and 102 may be capable of resisting twisting motions of lens holder 105. Springs 102 and 107 are described in more detail below in connection with FIGS. 3 and 4.

For one or more embodiments, bottom springs 107a and 107b may receive electrical signals from an auto-focus unit 112a and/or from a vibration Compensation unit 112b. These signals may be delivered through springs 107a and 107b to drive mechanisms 103a and 103b, respectively, via electrical connections 106a and 106b. For an embodiment, electrical connections 106a and 106b comprise wires, although the scope of claimed subject matter is not limited in this respect. Note that electrical connections 106a and 106b do not pass through housing 101, thus there is a reduced risk of wire rubbing and the resultant wear and tear and unreliability associated with such rubbing.

Also included in camera 100 for one or more embodiments is an image capture component 114. For one example, an image may be transmitted through lens 104 and sensed by image capture component 114. Digital data representing the captured image may be provided to auto-focus unit 112a and/or vibration compensation unit 112b. For auto-focus operations, auto-focus unit 112a may analyze the image data, which may be continually updated by image capture component 114 for one or more embodiments, and may determine that an adjustment to the focal length would be desirable to improve image quality. Auto-focus unit 112a may provide approximately equal voltage levels to each of drive mechanisms 103a and 103b, and drive mechanisms 103a and 103b may, in response, cause lens holder 105 to displace in a direction parallel with optical axis 116. This process may, for an embodiment, be iterative, in that after an adjustment in made, one or more additional images may be captured and analyzed to determine whether additional adjustments to the focal length are desirable. If a determination is made to perform additional adjustments, updated voltage levels may be delivered to drive mechanisms 103a and 103b, and the process may repeat as described.

For vibration compensation operations, a vibration compensation unit 112b may receive a stream of image data from image capture component 114, and may analyze the image data to determine whether a vibration condition exists, and if such a condition does exist, which adjustments to make to the drive mechanisms. For an example, assume that an appropriate vibration compensation move would entail applying a larger voltage value to drive mechanism 103a than to drive mechanism 103b, resulting for this example in lens holder 105 being tilted somewhat in relation to optical axis 116. The unequal voltage levels applied to drive mechanisms 103a and 103b result in the two sides of lens holder 105 moving in different amounts and/or in different directions, thereby producing the tilting motion. Of course, this is merely an example of moving a lens holder to compensate for vibration, and the scope of claimed subject matter is not limited in this respect.

For one or more embodiments, drive mechanisms 103a and 103b may comprise pairs of voice coils and magnets. For example, and as shown in more detail in the example embodiment of FIG. 2, a voice coil may be fixed to or otherwise make contact with lens holder 105. A magnet may be fixed to a lens holder cover such that there exists a space between the magnet and the voice coil. If an electrical current is applied to the voice coil, the electro-magnetic field set up by the current flowing through the coil causes the coil, and therefore the lens holder, to displace relative to the magnet.

In another embodiment, drive mechanisms 103a and 103b may comprise piezoelectric devices. A piezoelectric device may change its shape in response to an application of a voltage across the device. For an embodiment, the piezoelectric device may alter its length along the optical axis in response to the application of a voltage, thereby causing the lens holder to move in a direction parallel to the optical axis. In other embodiments, drive mechanisms may comprise electro-polymer devices that alter their length in response to an application of a voltage to the electro-polymer device. Still other embodiments may utilize motors for drive mechanisms. However, these are merely examples of the types of possible drive mechanisms that may be implemented in one or more embodiments, and the scope of claimed subject matter is not limited in this respect.

For at least some embodiments, including but not limited to the embodiment described in connection with FIG. 2, below, a plurality of drive mechanisms may be provided. Such drive mechanisms may be individually energized in order to more precisely specify an appropriate movement of the lens holder. For example, it may be possible to energize one drive mechanism (coil/magnet pair) at a particular voltage level and to energize a second drive mechanism at another voltage level or to not energize the second drive mechanism at all. Of course, these are merely examples of possible ways to selectively energize drive mechanisms coupled to lens holders, and the scope of claimed subject matter is not limited in this respect.

Figure 2:
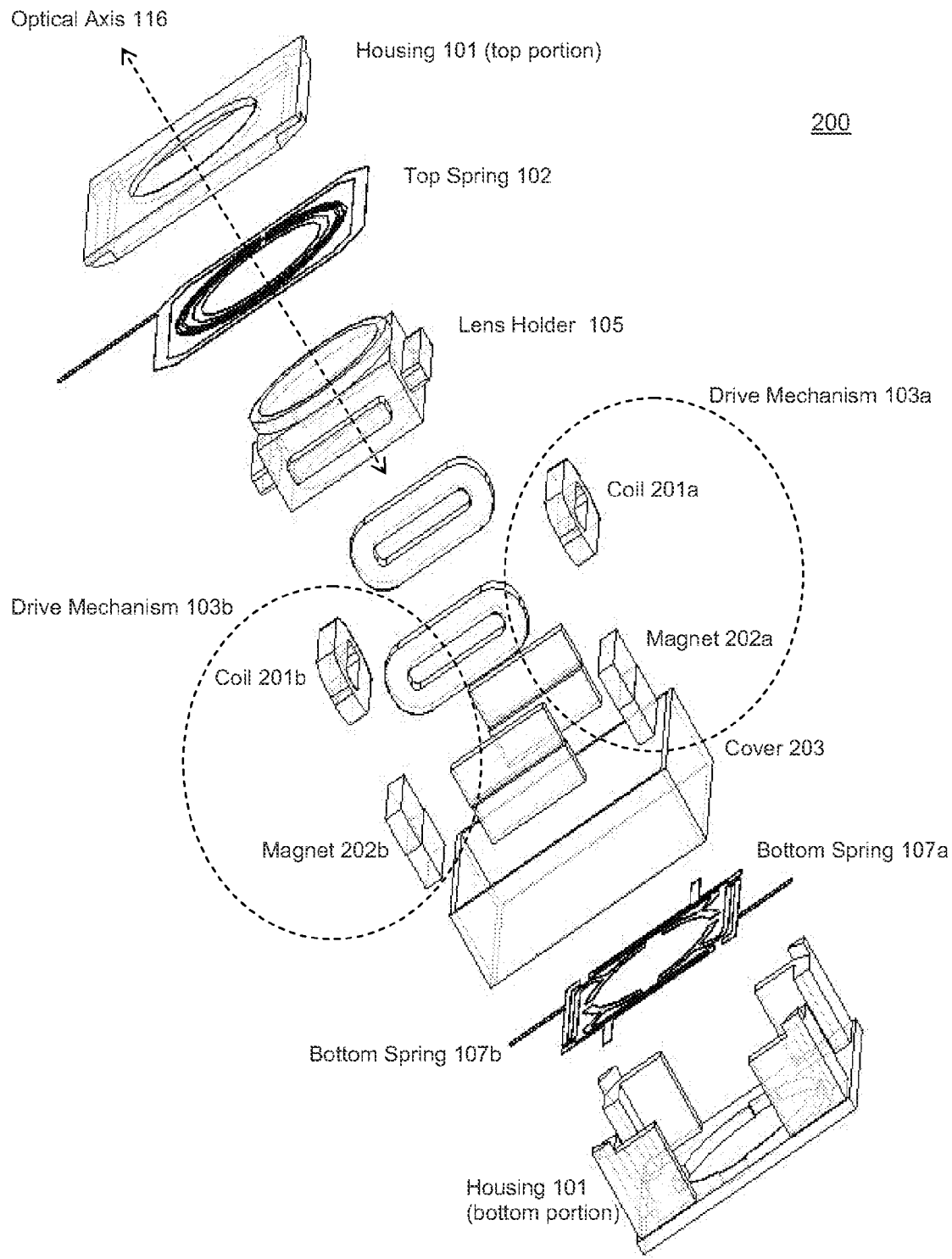
FIG. 2 is an exploded diagram of an example embodiment of a lens actuator.

FIG. 2 is an exploded perspective view of an example embodiment of lens actuator 200 introduced in FIG. 1. Lens holder 103 is disposed inside housing 101. Housing 101 for an embodiment may comprise a top portion and a bottom portion, which may fit together to form a frame and/or casing for lens holder 103. Although housing 101 is depicted in FIG. 2 as being formed of multiple components, the scope of claimed subject matter is not so limited, and other embodiments are possible where housing 101 comprises a unitary component and/or comprises multiple components that may differ from that shown in FIG. 2.

In the following description, the end of housing 101 farthest from the camera body may be designated as the direction "top" and the end through which the image falls onto the image capturing component may be designated as the direction "bottom". However, these are merely arbitrary labels used to make explanation easier, and the scope of claimed subject matter is not limited to literal "top" and "bottom" labels and/or directions.

FIG. 2 depicts the top and bottom surfaces of housing 101 to comprise apertures through which light may pass to reach image capturing component 114, depicted in FIG. 1. Lens actuator 200 for this example embodiment may be fixed and/or otherwise coupled to a camera body such that the bottom surface contacts the body. Also, although the embodiments described herein discuss digital cameras, whether stand alone or implemented within a cellular phone or other portable digital device, other example embodiments are possible where an actuator in accordance with claimed subject matter may be utilized in conjunction with a standard analog "film" camera or with any of a wide range of imaging devices.

For the example embodiment depicted in FIG. 2, drive mechanisms 103a and 103b each comprise a voice coil paired with a magnet. For example, coil 201a and magnet 202a comprise drive mechanism 103a, and coil 201b and magnet 202b comprise drive mechanism 103b. Voice coils 201a and 201b for one or more embodiments may be fixed to lens holder 105. As depicted in FIG. 2, lens holders 105 may comprise a plurality of protrusions upon which a plurality of coils may be positioned. Magnets 202a and 202b may be disposed inside housing 101 such that the planar surfaces of the magnetics are perpendicular to the longitudinal axis of the respective voice coils. Although the example embodiment depicted in FIG. 2 shows a one-to-one correlation between voice coils and magnets, other embodiments are possible using other configurations. For example, rather than a number of separate magnetic components, magnets 202a and 202b may comprise a single magnet corresponding to two or more voice coils. However, these are merely example configurations of voice coils and magnets, and the scope of claimed subject matter is not limited in these resects.

Magnets 202a and 202b may be positioned adjacent to but not contacting voice coils 201a and 202b, respectively, such that a magnetic field induced by electric current flowing through each of the coils 201 interacts with the magnetic field of magnets 202a and 202b. The interactions described above between the magnetic fields of magnets 202a and 202b and the magnetic fields induced by the electric current flowing through voice coils 201a and 202b may result in a force being exerted along optical axis 116 to repel the voice coils from the magnets, and the voice coils are displaced along the optical axis as a result. The movement of voice coils 201a and 202b may be translated into movement of lens holder 105 to which voice coils 201a and 201b are in contact.

Lens holder 105 for this example embodiment may comprise a substantially cylindrical shape in its interior and may further be adapted to hold a lens in place inside the cylinder. Lens 104 (not shown in FIG. 2) may be disposed within lens holder 105. Lens holder 105 may be formed of any of a wide range of materials. In an embodiment, lens holder 105 comprises a non-magnetic material, such as, for example, plastic.

Voice coils 201a and 201b for an example embodiment each may comprise a number of turns of electrically conductive wire. Electrical signals may be received from one or more circuits in a camera at one end of the coil wire, and the other end of the coil wire may, in an embodiment, be coupled to a ground voltage. As discussed previously, and as discussed more fully below, the voice coils may be individually energized, allowing for the movement of lens holder 105 in multiple dimensions.

In one or more embodiments, elements other than voice coils 201a and 201b magnets 202a and 202b, such as, for example, housing 101 and lens holder 105, may comprise non-magnetic materials such as plastics, so as not to interfere with the magnetic fields of the coils 105 and the magnetic element 106. Of course, these are merely example materials, and the scope of claimed subject is not limited in these respects.

Also for one or more embodiments, top spring 102 may be disposed at one end of the lens holder 103, positioned between lens holder 103 and the inside of the top portion of housing 101. Top spring 102 may provide a restoring force to lens holder 105 to allow for enhanced control and restricted movement of the lens holder. Bottom spring 107 may also provide a restoring force to lens holder 105 to restrict and control the movement of lens holder 105. As used herein, the term "spring" refers to any component capable of regaining its normal shape after removal of a stress.

Together, top spring 102 and bottom spring 107 may provide restoring forces to lens holder 105 in directions opposite to the displacement of coils 201a and 201b if energized. Top and/or bottom springs 102 and 107 may comprise coil springs in an embodiment. In another embodiment, top and/or bottom springs 102 and 107 may comprise leaf springs, examples of which are discussed more fully below in connection with FIGS. 3 and 4. Spring 102 and 107 may comprise any form that provides adequate restriction of movement and control of lens holder 105. The inner diameter(s) of springs 102 and 107 may be substantially the same as or greater than the inner diameter of lens holder 105 so that springs 102 and 107 do not interfere with the optical function of lens 104.

For one or more embodiments, bottom spring 107 may comprise a plurality of electrically conductive elements. In the example of FIG. 2, bottom spring 107 may comprise spring portions 107a and 107b. The plurality of electrically conductive elements of bottom spring 107 may supply independent electrical currents to voice coils 201a and 201b. For example, spring portion 107a may conduct an electrical signal from auto-focus unit 114a and/or from vibration compensation unit 114b to voice coil 201a, and spring portion 107b may conduct a different electrical signal from one or both of units 114a and 114b to voice coil 201b. As previously mentioned, voice coils may comprise a number of windings of a wire. One end of the winding wire may be connected to one of the plurality of electrically conductive elements of bottom spring 107, and the other end of the winding wire may be connected to top spring 102 which may be coupled to a ground voltage, for one example embodiment. In this manner, a control circuit such as auto-focus unit 114a and/or vibration compensation unit 114b may individually control each of the plurality of drive mechanisms. Further, bottom spring 107 retains its function of providing restoring forces to the lens holder, and the problems described above with wire rubbing may be avoided, since no wires need to be run through the housing. Thus, greater performance may be achieved with reduced costs and enhanced reliability.

Although FIG. 2 depicts drive mechanisms comprising voice coils and magnets, the scope of claimed subject matter is not limited in this respect. For example, other types of drive mechanisms may include any device that may change its shape, such as its length, in response to an input of some form of energy, such as a voltage. As previously mentioned, example types of materials that may undergo a change in shape in response to an application of a voltage include piezoelectric devices and electro-polymer devices.

As also previously discussed, if all of drive mechanisms 103 are energized with substantially the same amount of energy (e.g. electric current in the case of a coil-magnet combination of the example of FIG. 2), substantially the same amount of change of shape or displacement of the drive mechanisms may occur, thereby causing all the portions of lens holder 105 corresponding to the drive mechanisms to be displaced by substantially the same amount. The resulting motion of lens holder 105 may comprise a substantially linear motion along optical axis 116. Such linear motion may be advantageous in auto-focus operations.

Similarly, if one or more of drive mechanisms 103 are energized with unequal amounts of energy (e.g. differing electric currents in the case of a coil-magnet combination of the example of FIG. 2), differing amounts of change of shape or displacement of the drive mechanisms may occur, thereby causing various portions of lens holder 105 corresponding to the drive mechanisms to be displaced by unequal amounts. The resulting motion of lens holder 105 may comprise a tilting motion in relation to optical axis 116. Such tilting motion may be advantageous in vibration compensation operations.

Although at least some of the example embodiments described herein discuss employing embodiments of lens actuators with digital cameras, the scope of claimed Subject matter is not limited in this respect. For example, embodiments of lens actuators in accordance with claimed subject matter may find utility in a variety of optical imaging devices, including, but not limited to, still cameras, video cameras, motion picture cameras, and/or other digital and/or analog imaging devices.

Figure 3:
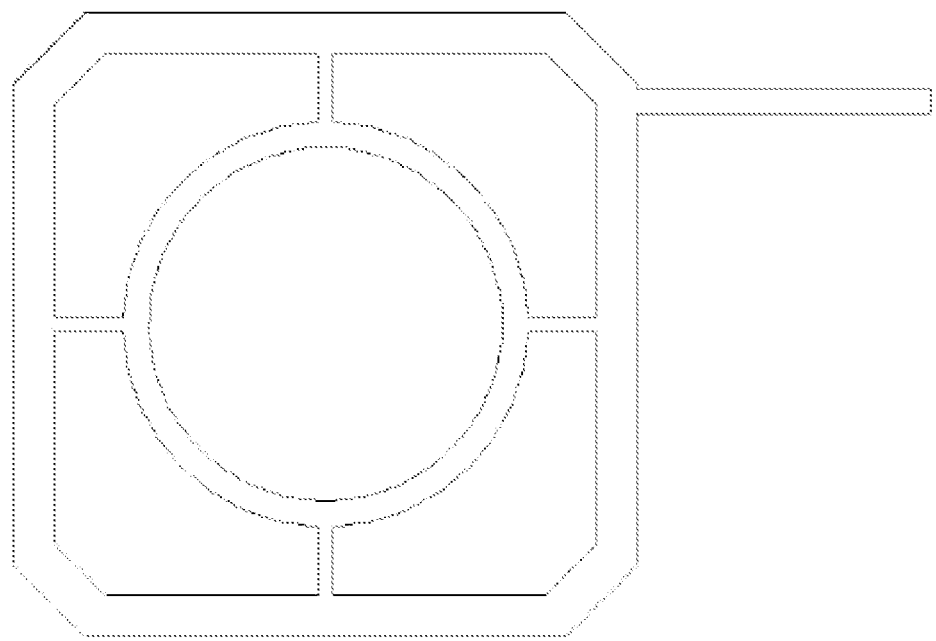
FIG. 3 is a diagram depicting an example embodiment of a spring.

FIG. 3 is a diagram depicting an example embodiment of top spring 102. Top spring 102 for this example embodiment may comprise a single device, although the scope of claimed subject matter is not limited in this respect. For example, other embodiments are possible where top spring 102 comprises more than one component. Also, although example embodiments described herein describe the use of a top spring, other embodiments may not use a top spring. For one or more embodiments, top spring 102 may comprise a leaf spring, and may comprise an electrically conductive and resilient material. The resiliency may help the spring perform its function of providing restoring forces to the lens holder. The electrical conductivity allows top spring 102 to also function as a common contact point for one or more drive mechanisms. For example, one end of each of the voice coil windings for those embodiments utilizing voice coils and magnets may be soldered to top spring 102. As can be seen in FIG. 3, top spring 102 may comprise an extension to allow connection to a PCB, for example.

Figure 4:
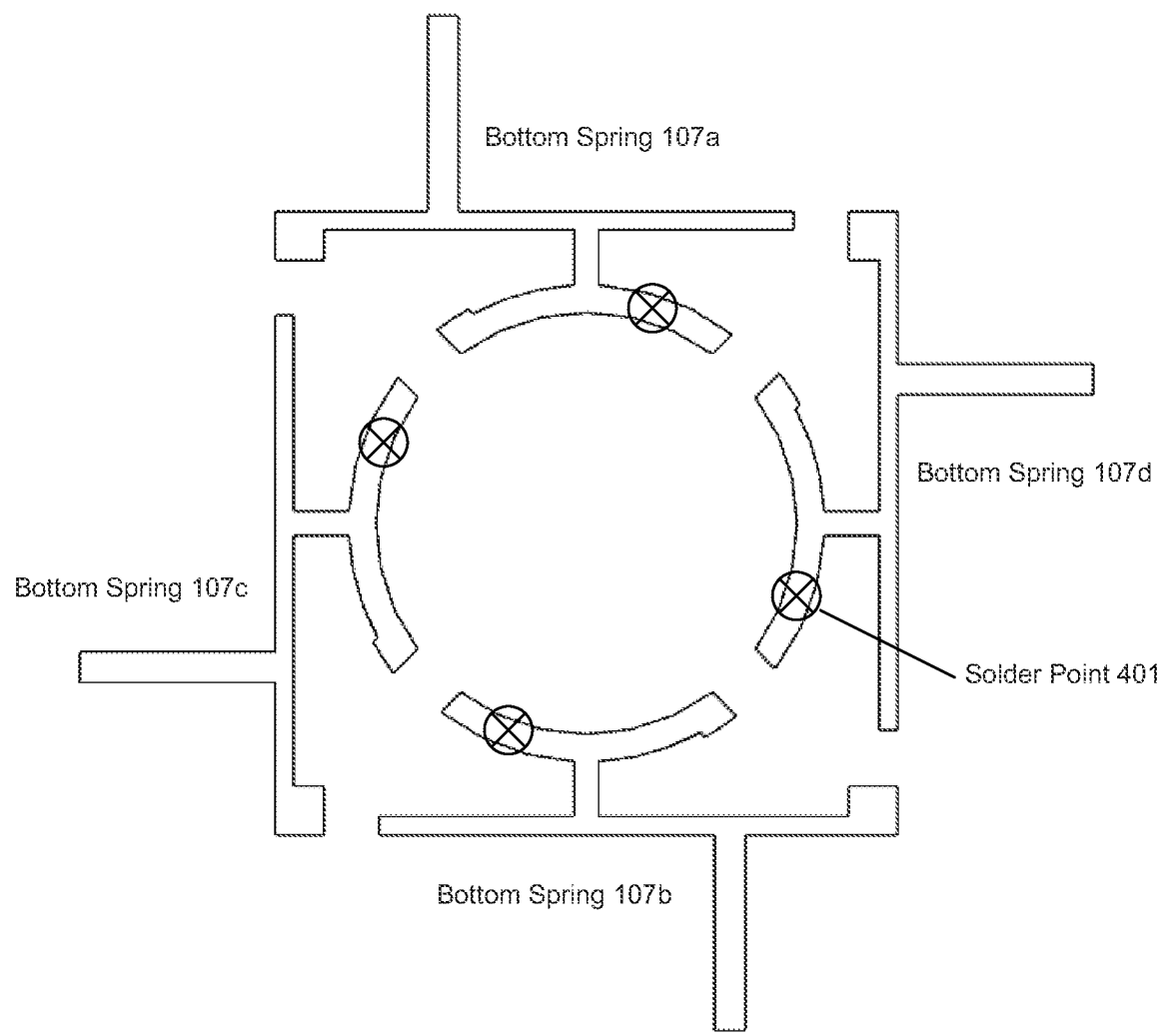
FIG. 4 is a diagram depicting an example embodiment of a spring comprising multiple electrically conductive elements.

FIG. 4 is a diagram depicting an example embodiment of bottom spring 107 comprising multiple electrically conductive elements 107a-107d. As depicted in FIG. 4, bottom spring 107 may comprise a plurality of components. The various components, however, operate together to perform spring functions. For one or more embodiments, one or more of the plurality of electrically conductive elements may provide restoring forces for the lens holder. The plurality of elements each comprise a portion of a leaf spring, in one example embodiment. Further, each of the plurality of electrically conductive elements may conduct electrical signals from a control circuit to one or more drive mechanisms, such as drive mechanisms 103 described above. By providing multiple electrically conductive elements, one or more of which are capable of providing restoring forces for the lens holder, individual control of the drive mechanisms is made possible. The lack of wires passing through housing 101 to control the drive mechanisms may result in improved reliability, as well as reduced costs.

For one or more embodiments, bottom spring 107 may comprise one or more electrically conductive and resilient materials. The resiliency may help the plurality of elements perform their functions of providing restoring forces to the lens holder. The electrical conductivity may allow bottom spring 107 to further function as multiple individual pathways for electrical signals bound for one or more drive mechanisms. The various drive mechanisms may be connected to one or more of the plurality of electrically conductive elements by soldering leads to the electrically conductive elements as depicted in FIG. 4, where possible solder points 401 are shown. Of course, these are merely examples of how drive mechanisms may be coupled to bottom spring 107, and the scope of claimed subject matter is not limited in these respects. As further depicted in FIG. 4, each of the plurality of electrically conductive elements of bottom spring 107 may comprise an extension to allow coupling of the electrically conductive elements with a printed circuit board, although again, the scope of claimed subject matter is not limited in this respect.

Although the example embodiment depicted in FIG. 4 comprises multiple components, other embodiments are possible where bottom spring 107 comprises a single component. In such an embodiment, the plurality of electrically conductive elements may be coupled on to another by way of a non-conductive material in order to preserve the ability to individually control the various drive mechanisms.

Figure 5:
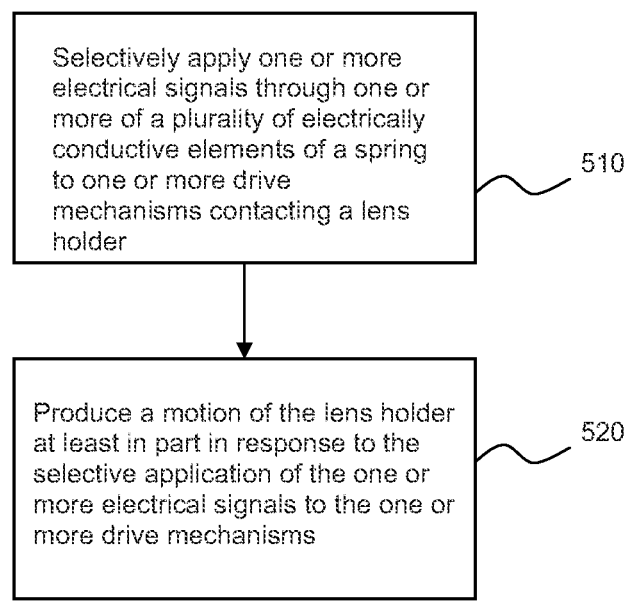
FIG. 5 is a flow diagram of an example embodiment of a method for adjusting the position of a lens.

FIG. 5 is a flow diagram of an example embodiment of a method for adjusting the position of a lens. At block 510, one or more electrical signals are selectively applied through one or more of a plurality of electrically conductive elements of a spring to one or more drive mechanisms contacting a lens holder. At block 520, a motion of the lens holder may be produced at least in part in response to the selective application of the one or more electrical signals to the one or more drive mechanisms. Embodiments in accordance with claimed subject matter may include all, less than, or more than blocks 510-520. Further, the order of blocks 510-520 is merely an example order, and the scope of claimed subject matter is not limited in this respect.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
selectively applying one or more electrical signals through one or more of a plurality of electrically conductive elements of a spring to a plurality of drive mechanisms contacting a lens holder, the spring to provide a restoring force; and
producing a motion of the lens holder at least in part in response to the selective application of the one or more electrical signals to the plurality of drive mechanisms, the plurality of drive mechanisms individually to produce a linear motion at least in part in response to being energized to displace the lens holder relative to the housing to produce a linear and tilting motion in the lens holder, the linear and tilting motion to perform an auto-focusing function and an anti-shaking function, wherein the linear motion comprises movement parallel to an optical axis of a lens in the lens holder, and wherein the tilting motion comprises movement about an axis perpendicular to the optical axis of the lens in the lens holder.

2. The method of claim 1, wherein said selectively applying one or more electrical signals through the one or more of a plurality of electrically conductive elements of the spring to the plurality of drive mechanisms comprises selectively applying the one or more electrical signals through the one or more of the plurality of electrically conductive elements of the spring to one or more of a coil and magnet, a piezoelectric component, and/or an electro-active polymer component.

3. The method of claim 1, wherein said producing the motion comprises producing a linear and a tilting motion of the lens holder at least in part in response to the selective application of the one or more electrical signals.

4. An optical apparatus, comprising:
means for producing a motion of a lens holder, wherein said means for producing the motion comprises a plurality of elements capable of independent operation;
means for applying a restoring force to the lens holder, said means for applying the restoring force comprising means for conducting a plurality of electrical signals to the plurality of elements capable of independent operation; and
means for selectively applying one or more of said plurality of electrical signals to one or more of the plurality of elements capable of independent operation, the one or more of the plurality of elements capable of independent operation to individually produce a linear motion at least in part in response to being energized to displace the lens holder to produce a linear and tilting motion in the lens holder, the linear and tilting motion comprising an auto-focusing function and an anti-shaking function, wherein the linear motion comprises movement parallel to an optical axis of a lens in the lens holder, and wherein the tilting motion comprises movement about an axis perpendicular to the optical axis of the lens in the lens holder.

5. An imaging device, comprising:
a lens actuator, comprising
a housing,
a lens disposed in a lens holder,
a plurality of drive mechanisms coupled to the lens holder and/or the housing, one or more of the plurality of drive mechanisms individually to produce linear motion if energized to displace the holder relative to the housing to produce a linear and tilting motion in the lens holder, the linear and tilting motion comprising an auto-focusing function and an anti-shaking function, wherein the linear motion comprises movement parallel to an optical axis of a lens in the lens holder, and wherein the tilting motion comprises movement about an axis perpendicular to the optical axis of the lens in the lens holder, and
at least one spring coupled to the lens holder and/or the housing, the at least one spring to provide a restoring force to the lens holder, the at least one spring comprising a plurality of electrically conductive elements coupled to one or more of the plurality of drive mechanisms, the plurality of drive mechanisms to produce a motion of the lens holder at least in part in response to an application of one or more electrical signals to a respective one or more of the plurality of electrically conductive elements of the at least one spring;
an image capture component to receive an image transmitted through the lens; and a control unit to analyze the received image to determine an appropriate corrective movement of the lens for the auto-focusing function and the anti-shaking function, the control unit to apply the one or more electrical signals to the respective one or more of the plurality of electrically conductive elements of the at least one spring to enable the plurality of drive mechanisms to produce the corrective movement of the lens.

6. The imaging device of claim 5, wherein the housing comprises a top portion and a bottom portion, the at least one spring disposed between the lens holder and the bottom portion of the housing, the at least one spring comprising a leaf spring comprising the plurality of electrically conductive elements, one or more of the electrically conductive elements comprising an extension to provide an electrical connection to a printed circuit board.

7. The imaging device of claim 6, further comprising a top electrically conductive element disposed between the lens holder and the top portion of the housing, each of the plurality of drive mechanisms electrically connected to the top electrically conductive element and to one of the plurality of electrically conductive elements of the one or more spring.

8. The imaging device of claim 7, the top electrically conductive element comprising an additional spring to provide an additional restoring force to the lens holder.

9. The imaging device of claim 8, each of the plurality of drive mechanisms to be individually actuated at least in part in response to the application of the one or more electrical signals to the respective one or more of the plurality of electrically conductive elements of the at least one spring, the corrective motion comprising linear and/or tilting motion of the lens holder.

10. The imaging device of claim 5, the plurality of drive mechanisms comprising one or more of a coil and magnet, a piezoelectric component, and/or an electro-active polymer component.

11. An actuator for use in an optical system, comprising:
a housing;
a lens holder positioned at least partially inside the housing;
at least one spring coupled to said lens holder and/or said housing; and
a plurality of drive mechanisms coupled to one or more of said lens holder and said housing, one or more drive mechanisms of the plurality of drive mechanisms to individually produce linear motion if energized through at least one electrically conductive element to displace the lens holder relative to the housing to produce a linear and tilting motion of the lens holder, the linear and tilting motion comprising an auto-focusing function and an anti-shaking function, wherein the linear motion comprises movement parallel to an optical axis of a lens in the lens holder, and wherein the tilting motion comprises movement about an axis perpendicular to the optical axis of the lens in the lens holder.

12. The actuator of claim 11, wherein said at least one electrically conductive element comprises at least one spring coupled to said lens holder and/or said housing.

* * * * *